United States Patent
Yoshitake

(10) Patent No.: US 7,234,005 B2
(45) Date of Patent: Jun. 19, 2007

(54) SYSTEM AND METHOD OF SETTING PARAMETERS OF PERIPHERAL DEVICE WHEN AN OPERATION RATIO OF A COMMAND EXCEEDS PREDETERMINED VALUE

(75) Inventor: Nobuaki Yoshitake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 10/094,005

(22) Filed: Mar. 7, 2002

(65) Prior Publication Data

US 2003/0051078 A1 Mar. 13, 2003

(30) Foreign Application Priority Data

Sep. 13, 2001 (JP) ............................. 2001-278613

(51) Int. Cl.
*G06F 13/00* (2006.01)
*G06F 3/00* (2006.01)

(52) U.S. Cl. ..................... 710/9; 710/1; 710/5; 710/8; 710/12; 710/14; 710/15; 710/16; 710/17; 710/18; 710/19; 710/31; 710/33; 710/36; 710/43; 710/62; 710/220; 712/28; 712/225

(58) Field of Classification Search .................... 710/1, 710/5, 8, 9, 12, 14–19, 31, 33, 36, 43, 62, 710/220; 712/225, 28
See application file for complete search history.

(56) References Cited

U.S. PATENT DOCUMENTS

| | | | | |
|---|---|---|---|---|
| 5,590,336 A | * | 12/1996 | Parry | 710/220 |
| 5,850,573 A | * | 12/1998 | Wada | 710/62 |
| 5,890,014 A | * | 3/1999 | Long | 710/8 |
| 6,157,968 A | * | 12/2000 | Baruch et al. | 710/20 |
| 6,230,211 B1 | * | 5/2001 | Mahajan | 719/315 |
| 6,671,748 B1 | * | 12/2003 | Cole et al. | 710/8 |

OTHER PUBLICATIONS

Kozierok, Charles, Why DMA Channels Were Invented for Data Transfer, http://www.PCGuide.com, version 2.2.0, dated Apr. 17, 2001, 1 pg.*

* cited by examiner

*Primary Examiner*—Tammara Peyton
(74) *Attorney, Agent, or Firm*—Greer, Burns & Crain, Ltd.

(57) ABSTRACT

A method of setting a parameter of a peripheral device, for controlling an operation of the peripheral device includes collecting and storing a command issued for the peripheral device by an external device, analyzing a command issue pattern for the peripheral device based on the stored command, and determining a most proper value of the parameter based on the command issue pattern. The most proper value of the parameter determined is set as a parameter for controlling the operation of the peripheral device.

15 Claims, 13 Drawing Sheets

FIG.6

| Byte \ Bit | 7 | 6 | 5 | 4 | 3 | 2 | 1 | 0 |
|---|---|---|---|---|---|---|---|---|
| 0 | \multicolumn{8}{c}{PAGE CODE} |
| 1 | 0 | 0 | 0 | 0 | 0 | 0 | 1 | 0 |
| 2 | \multicolumn{8}{c}{PAGE LENGTH} |
| 3 | | | | | | | | |
| 4 | 0 | 0 | 0 | 0 | 0 | 0 | 0 | 0 |
| 5 | CMD | SEQ | RND | SKIP | FHIT | PHIT | MTHRD | DATAQ |
| 6 | 0 | 0 | 0 | 0 | 0 | 0 | 0 | ST |
| 7 | \multicolumn{8}{c}{NUMBER OF COLLECTION} |
| 8 | 0 | 0 | 0 | 0 | 0 | 0 | 0 | RepType |
| 9 | 0 | 0 | 0 | 0 | 0 | 0 | 0 | 0 |
| 10 | | | | | | | | |
| 11 | \multicolumn{8}{c}{LOG ANALYSIS RESULT} |
| ·· | | | | | | | | |
| xx | | | | | | | | |

FIG.7

| NUMBER OF RECEIVING COMMAND FOR SUBJECT OF LOG | 00001F28 |
|---|---|
| SEQUENTIAL ACCESS | 00000A00 |
| RANDOM ACCESS | 00000200 |
| FULL HIT OF CACHE | 00001000 |
| PARTIAL HIT OF CACHE | 000003DC |
| SKIP ACCESS | 000000EF |
| MULTITHREAD | 00000010 |
| DATA QUEUING | 000001FE |

FIG.8

| OPE-CODE | HEAD LBA | NUMBER OF TRANSFERRED BLOCK | QUEUE TAG | TIME STAMP |
|---|---|---|---|---|
| 2A | 001A34E0 | 0100 | 20 | 00000100 |
| 28 | 000F4320 | 0020 | 21 | 00000110 |
| 28 | 00203456 | 0010 | 20 | 00000200 |
| ⋮ | ⋮ | ⋮ | ⋮ | ⋮ |
| 2A | 00F32890 | 0100 | 22 | 00001000 |

FIG.11

DISCONNECT/RECONNECT·PARAMETER ( PAGE CODE = 2 )

| | Bit | | | | | | | |
|---|---|---|---|---|---|---|---|---|
| | 7 | 6 | 5 | 4 | 3 | 2 | 1 | 0 |
| Byte 0 | (PS)* | 0 | 0 | 0 | 0 | 0 | 1 | 0 |
| 1 | PAGE LENGTH ||||||||
| 2 | BUFFER FULL RATIO ||||||||
| 3 | BUFFER EMPTY RATIO ||||||||
| 4 | BUS INACTIVITY LIMIT ||||||||
| 5 | ||||||||
| 6 | DISCONNECT TIME LIMIT ||||||||
| 7 | ||||||||
| 8 | CONNECT TIME LIMIT ||||||||
| 9 | ||||||||
| 10 | MAXIMUM BURST SIZE ||||||||
| 11 | ||||||||
| 12 | EMDP | FAIR ARBITRATION ||| DImm || DTDC ||
| 13 | Reserved ||||||||
| 14 | ||||||||
| 15 | ||||||||

FIG.12

CACHING PARAMETER ( PAGE CODE = 8 )

| | Bit | | | | | | | |
|---|---|---|---|---|---|---|---|---|
| | 7 | 6 | 5 | 4 | 3 | 2 | 1 | 0 |
| Byte 0 | (PS)* | 0 | 0 | 0 | 1 | 0 | 0 | 0 |
| 1 | PAGE LENGTH | | | | | | | |
| 2 | IC | ABPF | CAP | DISC | SIZE | WCE① | MS | RCD② |
| 3 | PRIORITY OF HOLDING READ DATA | | | | PRIORITY OF HOLDING WRITE DATA | | | |
| 4 | PRE-FETCH DETER BLOCK NUMBER | | | | | | | |
| 5 | | | | | | | | |
| 6 | MINIMUM PRE-FETCH | | | | | | | |
| 7 | | | | | | | | |
| 8 | MAXIMUM PRE-FETCH | | | | | | | |
| 9 | | | | | | | | |
| 10 | MAXIMUM PRE-FETCH LIMIT BLOCK NUMBER | | | | | | | |
| 11 | | | | | | | | |
| 12 | FSW | LBCSS | DRA | VS | VS | Reserved | | |
| 13 | CACHE SEGMENT NUMBER | | | | | | | |
| 14 | CACHE SEGMENT SIZE | | | | | | | |
| 15 | | | | | | | | |
| 16 | Reserved | | | | | | | |
| 17 | | | | | | | | |
| 18 | NO CACHE BUFFER SIZE | | | | | | | |
| 19 | | | | | | | | |

FIG.13

CONTROL MODE PARAMETER ( PAGE CODE = 0A )

| Byte | Bit 7 | 6 | 5 | 4 | 3 | 2 | 1 | 0 |
|---|---|---|---|---|---|---|---|---|
| 0 | (PS)* | 0 | 0 | 0 | 0 | 0 | 1 | 0 |
| 1 | \ | \ | \ | \ | \ | \ | \ | \ |
| 2 | \ | \ | \ | \ | PAGE LENGTH | \ | 1 | 0 |
| 3 | \ | TST | \ | \ | Reserved | \ | GLTSD | RLEC |
| 4 | QUEUE ALGORISM DECORATOR | \ | \ | \ | Rsvd | QErr | DQue |
| 5 | Rsvd | RAC | \ | Reserved | \ | SWP | RAERP | UAAERP | EAERP |
| 6 | X '00' (Reserved) |
| 7 | READY AER HOLDOFF PERIOD |
| 8 | BUSY TIMEOUT PERIOD |
| 9 | |
| 10 | EXPAND SELF TEST EXECUTION TIME |
| 11 | |

SYSTEM AND METHOD OF SETTING PARAMETERS OF PERIPHERAL DEVICE WHEN AN OPERATION RATIO OF A COMMAND EXCEEDS PREDETERMINED VALUE

BACKGROUND OF THE INVENTION

1. Field of the Invention

The present invention generally relates to methods of setting parameters of a peripheral device and peripheral devices, and more particularly, to a method of setting parameters of a peripheral device and a peripheral device whose operation is controlled based on the parameters stored inside the peripheral device.

2. Description of the Related Art

A large number of parameters are set in a peripheral device such as a hard disk drive in order to improve the performance of the peripheral device. Proper operation to use a drive in current conditions can be implemented by changing the parameters. However, it is not easy to set a large number of parameters properly. Hence, there is a demand for a method by which the parameters can be set to use the drive properly based on the current conditions.

For example, a small computer system interface (SCSI) standard is used as a standard of an interface for connecting the peripheral device such as the hard disk drive with a host computer.

Parameters for improving the performance of the hard disk drive are set in the SCSI standard. A mode parameter is used as the main parameter of the parameters set in the SCSI standard. The mode parameter mainly includes the number of cache segment, the cache segment size, the buffer full ratio, the buffer empty ratio, the read cache disable bit, the write cache enable bit, the minimum pre-fetch parameter, the maximum pre-fetch parameter, and the queue algorithm modifier.

The cache segment number is a parameter for dividing all data cache areas held by the hard disk drive.

The cache segment size is a parameter for designating the number of bytes into which all data cache areas held by the hard disk drive are divided.

The buffer full ratio is a parameter for designating the amount of data to be loaded from a medium to a data buffer until the disk storage device starts to execute a reconnection process at the time a read process is executed When a write process is executed, the disk storage device executes to write data in the medium until the reconnection process is started. As a result, the data buffer is provided with an opening area. The buffer empty ratio is a parameter for designating a size of the opening area at the data buffer.

The read cache disable bit is a parameter for allowing or prohibiting an operation of a cache mechanism when the read process is executed.

The write cache enable bit is a parameter for allowing or prohibiting an operation of a cache mechanism when the write process is executed.

The minimum pre-fetch parameter is a parameter for designating a minimum amount of a logic data block that is pre-fetched to the data buffer when the read process is executed.

The maximum pre-fetch parameter is a parameter for designating a maximum amount of the logic data block that is pre-fetched to the data buffer when the read process is executed.

The queue algorithm modifier is a parameter for controlling an algorithm of an execution order of a command issued with a simple queue tag.

In addition, the hard disk drive includes a cache function whose operation in the case of a read process is different from in the case of a write process, in order to utilize the data buffer effectively and improve effective access speed.

In a cache function at the time of the read process, required data are read from the medium and transmitted to the host computer when a read command is executed, and a pre-fetching is executed. In the pre-fetching, a following data block to the final logic data block designated by the read command is loaded into the data buffer. When some of the pre-fetched data blocks are designated by a read command issued later, the hard disk drive does not access the medium and but instead the data are transmitted from the data buffer to the host computer directly. Based on such a process, it is possible to drastically reduce the effective access time in a case that a sequential logic data block group is read out sequentially.

It is expected to improve the performance of the hard disk drive by applying the cache function in the case of the read process to not only the sequential access but also to a process of a skip read or a multithread function.

In a cache function at the time of the write process, when a write command is executed, the data transmitted from the host computer is loaded to the data buffer and the status of a termination of the command process is reported to the host computer. It is possible to drastically reduce the effective access time when the write process is executed, by writing the data loaded to the data buffer in the medium during the interval of execution of other command processes.

In the cache function at the time of the write process, it is possible to transmit the data from the data buffer to the host computer directly, when a read process to a logic block to which the read process to the medium has not terminated is issued most recently.

Furthermore, the hard disk drive can execute a reordering process wherein plural commands issued by the host computer are received by a queuing function of a command with a tag.

By the queuing function, when a queued command is executed, not only is the command executed in the order issued by the host computer, but also an order to execute is changed based on a seek time to access the medium or a waiting time for rotation. As a result, the access time can be reduced.

As described above, the hard disk drive has a large number of parameters related to the performance of the hard disk drive. However, it may be not possible to determine the respective set values of the mode parameters that contribute to improving the performance of the hard disk drive, if functions of both the host computer and the hard disk drive are not understood.

If functions of both the host computer and the hard disk drive are not understood, it is difficult to set the mode parameters properly based on the current conditions for using the drive, because a similar measurement with various combinations of the parameters is necessary to find a most proper value of the mode parameters.

When a read process command to hit a cache data loaded to the data buffer is issued, the number of the accesses to the medium is reduced so that the performance of the drive may be improved. However, when the read process command to hit a cache data loaded to the data buffer is rarely issued, overhead against the command process is increased because of the pre-fetch process to the data cache or the cache hit check process, and thereby the performance of the drive declines.

Since a present cache function is operated frequently without recognizing whether the command issued by the host computer hits the cache data, the present cache function is not always used effectively.

Furthermore, when the reordering process is executed, whether or not the cache data in the data buffer is hit deserves to be considered as well as the seek time to access the medium or the waiting time for the rotation of the medium. However, if such process is simply added, overhead based on the check process occurs in a case of a command issue pattern having a low cache hit ratio, and thereby the performance of the hard disk drive is reduced.

In addition, it is impossible to keep the same circumstances pertaining to the performance of the hard disk drive. That is, circumstances affecting the use of the hard disk drive such as temperature, humidity, the date or time to use the hard disk drive are changeable. Therefore, it is difficult to obtain a same performance result of the hard disk drive even if the hard disk drive is used in a completely same operational circumstance.

SUMMARY OF THE INVENTION

Accordingly, it is a general object of the present invention to provide a novel and useful method of setting parameters of a peripheral device and a peripheral device whose operation is controlled based on parameters stored inside the peripheral device in which one or more of the problems described above are eliminated.

Another and more specific object of the present invention is to provide a method of setting parameters of a peripheral device properly based on a state wherein the peripheral device is used, and the peripheral device.

The above objects of the present invention are achieved by a method of setting a parameter of a peripheral device, the parameter controlling an operation of the peripheral device, including the steps of a) collecting and storing a command issued for the peripheral device by an external device, b) analyzing a command issue pattern for the peripheral device based on the command stored in the step a), c) determining a most proper value of the parameter based on the command issue pattern, and d) setting the most proper value of the parameter determined in the step c) as a parameter for controlling the operation of the peripheral device. The above objects of the present invention are also achieved by a peripheral device in which a parameter for controlling an operation of the peripheral device is set, including means for collecting and storing a command issued for the peripheral device by an external device, means for analyzing a command issue pattern for the peripheral device based on the command stored by the means for collecting and storing the command, means for determining a most proper value of the parameter based on the command issue pattern, and means for setting the most proper value of the parameter determined by the means for determining the most proper value as a parameter for controlling the operation of the peripheral device.

According to the present invention as described above, it is possible to set the parameter based on the state to use the peripheral device by changing the parameter for controlling the operation of the peripheral device to a proper value based on the command issued to the peripheral device. As a result, it is possible to operate the device in a proper circumstance to use the device.

The command may be collected in a designated period of time in the step a). A designated kind of command may be collected in the step a).

According to the present invention described above, it is possible to reduce a loss in the efficiency of the device that occurs due to a storage of the command.

The most proper value of the parameter may be set by an order of the peripheral device in the step d).

According to the present invention described above, it is possible to apply the most proper value as a parameter for controlling an operation of the peripheral device, if necessary.

Other objects, features, and advantages of the present invention will become more apparent from the following detailed description when read in conjunction with the accompanying drawings.

BRIEF DESCRIPTION OF THE DRAWINGS

FIG. 2-(B) is a sectional view taken on line A—A in FIG. 2-(A);

FIG. 6 is a chart for showing a data structure of a command collect page;

FIG. 7 is a command storage form in a case that the command collect process is executed;

FIG. 8 is an additional command storage form in a case that the command collect process is executed;

FIG. 11 is a view for indicating a disconnect/reconnect parameter setting page;

FIG. 12 is a view for indicating a caching parameter setting page; and

FIG. 13 is a view for indicating a control mode parameter setting page.

DETAILED DESCRIPTION OF THE PREFERED EMBODIMENTS

A description will now be given, with reference to the drawings, of embodiments of the present invention.

First a hard disk drive will be described with reference to FIGS. 1 through 3.

Figure 1:
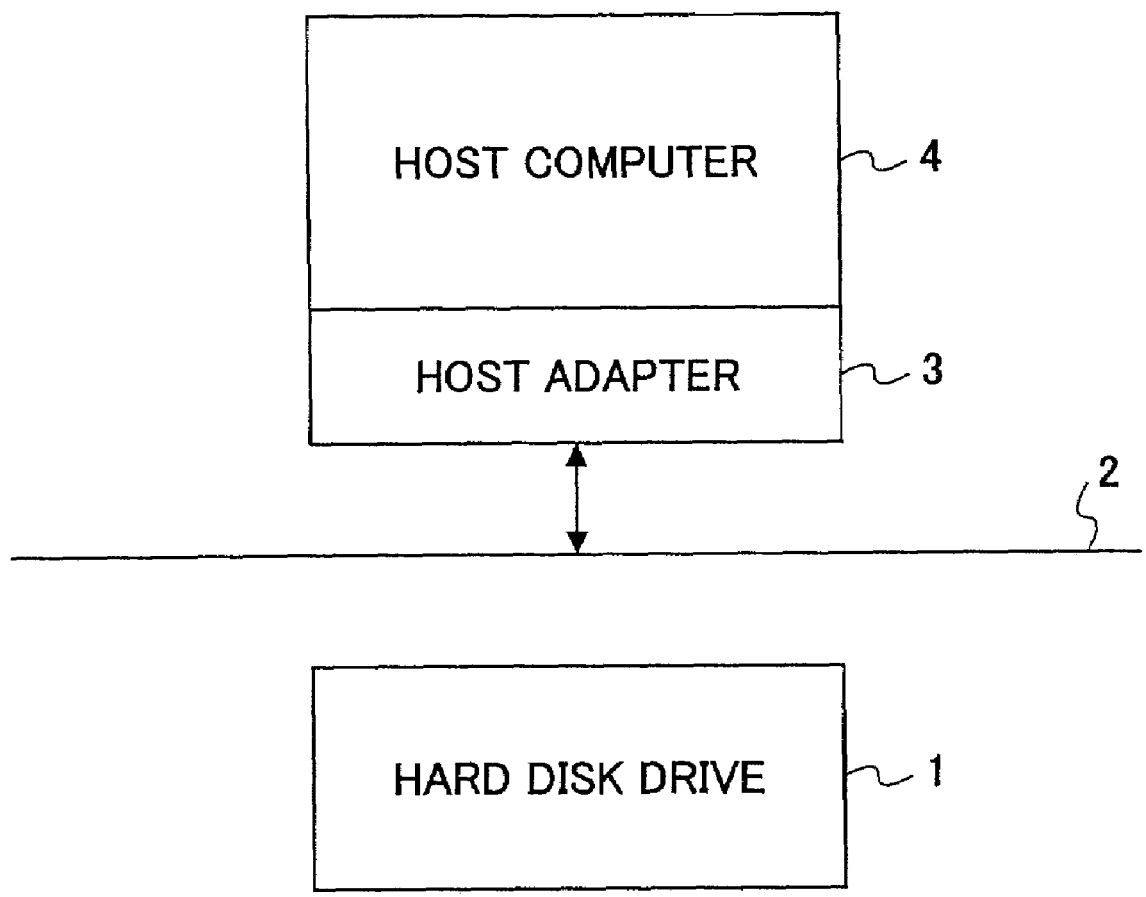
FIG. 1 is a block diagram of an SCSI system in an embodiment of the present invention.

FIG. 1 is a block diagram of an SCSI system in an embodiment of the present invention. FIG. 2-(A) is a plan view of the hard disk drive in an embodiment of the present invention, and FIG. 2-(B) is a sectional view taken on line A—A in FIG. 2-(A). FIG. 3 is a block diagram of the hard disk drive in the embodiment of the present invention.

Referring to FIG. 1, a hard disk drive 1 is connected with a host computer 4 through an SCSI bus 2 and a host adapter 3.

Figure 2:
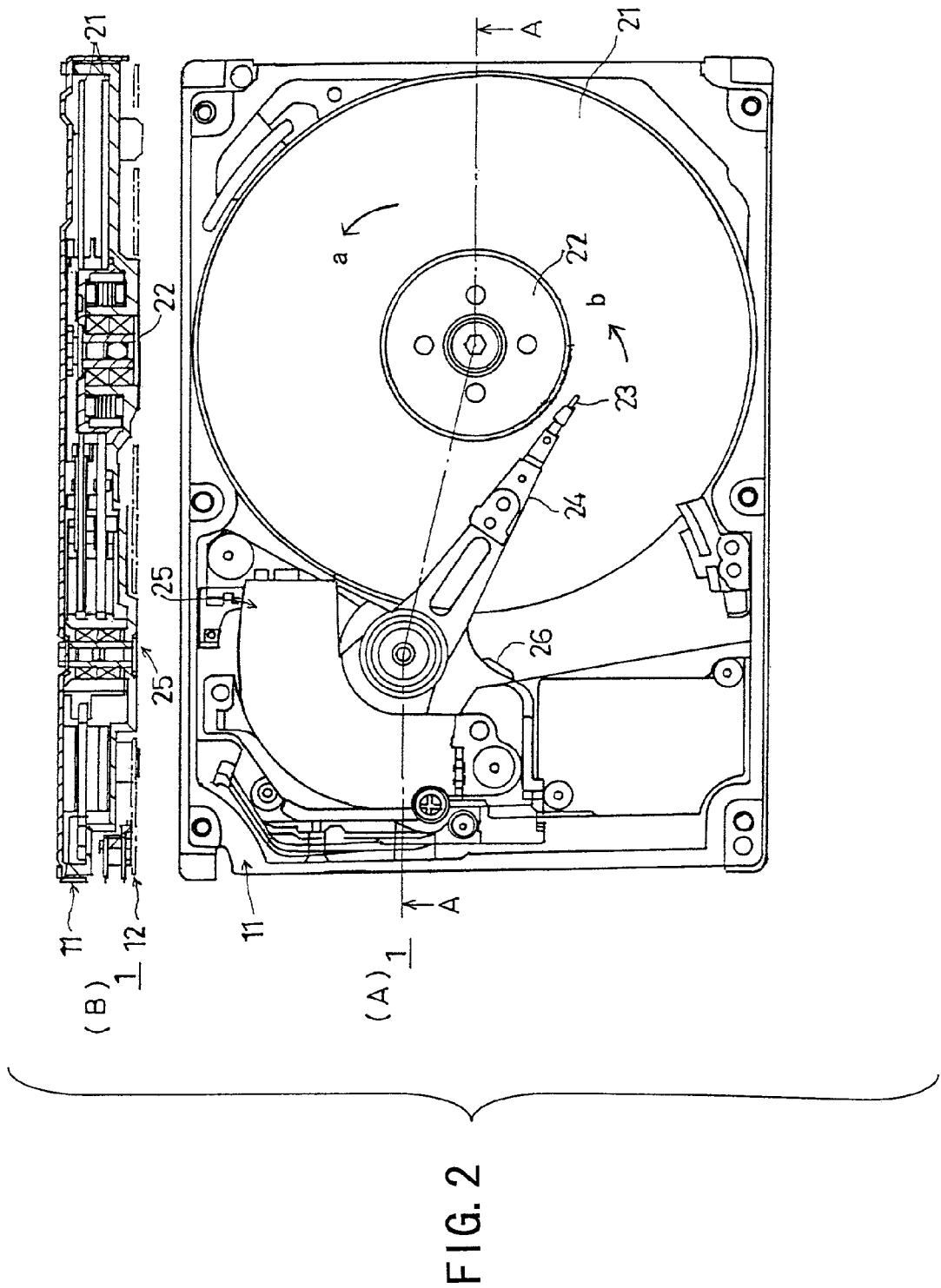
FIG. 2-(A) is a plan view of the hard disk drive in the embodiment of the present invention.

Referring to FIG. 2, the hard disk drive 1 includes a disk enclosure 11 and a circuit board 12. A magnetic disk 21, a spindle motor 22, a magnetic head 23, a head arm 24, a voice coil motor 25, and a head integrated circuit (IC) 26 are received in the disk enclosure 11. The magnetic disk 21 is fixed to a rotating shaft of the spindle motor 22 and rotates to an arrow "a" direction as the spindle motor 22 rotates.

The magnetic head 23 is arranged to face the magnetic disk 21. The magnetic head 23 is applied to the magnetic head magnetically so that information is recorded to or played back from the magnetic disk 21. The magnetic head 23 is fixed at a head end of the head arm 24. The other end of the head arm 24 is connected to the voice coil motor 25 so that the head arm 24 can be rotated to an arrow "b" direction by the voice coil motor 25. When the head arm 24 rotates to the arrow "b" direction, the magnetic head 23 also moves to a radius direction of the magnetic head 21 namely the arrow "b" direction.

The magnetic head 23 is connected with the head IC 26. A signal recorded to the magnetic disk 21 by the magnetic head 23 is amplified by the head IC 26 and supplied to the magnetic head 23. A play back signal which is played back from the magnetic disk 21 by the magnetic head 23 is amplified by the head IC 26 and supplied to the circuit board 12.

Figure 3:
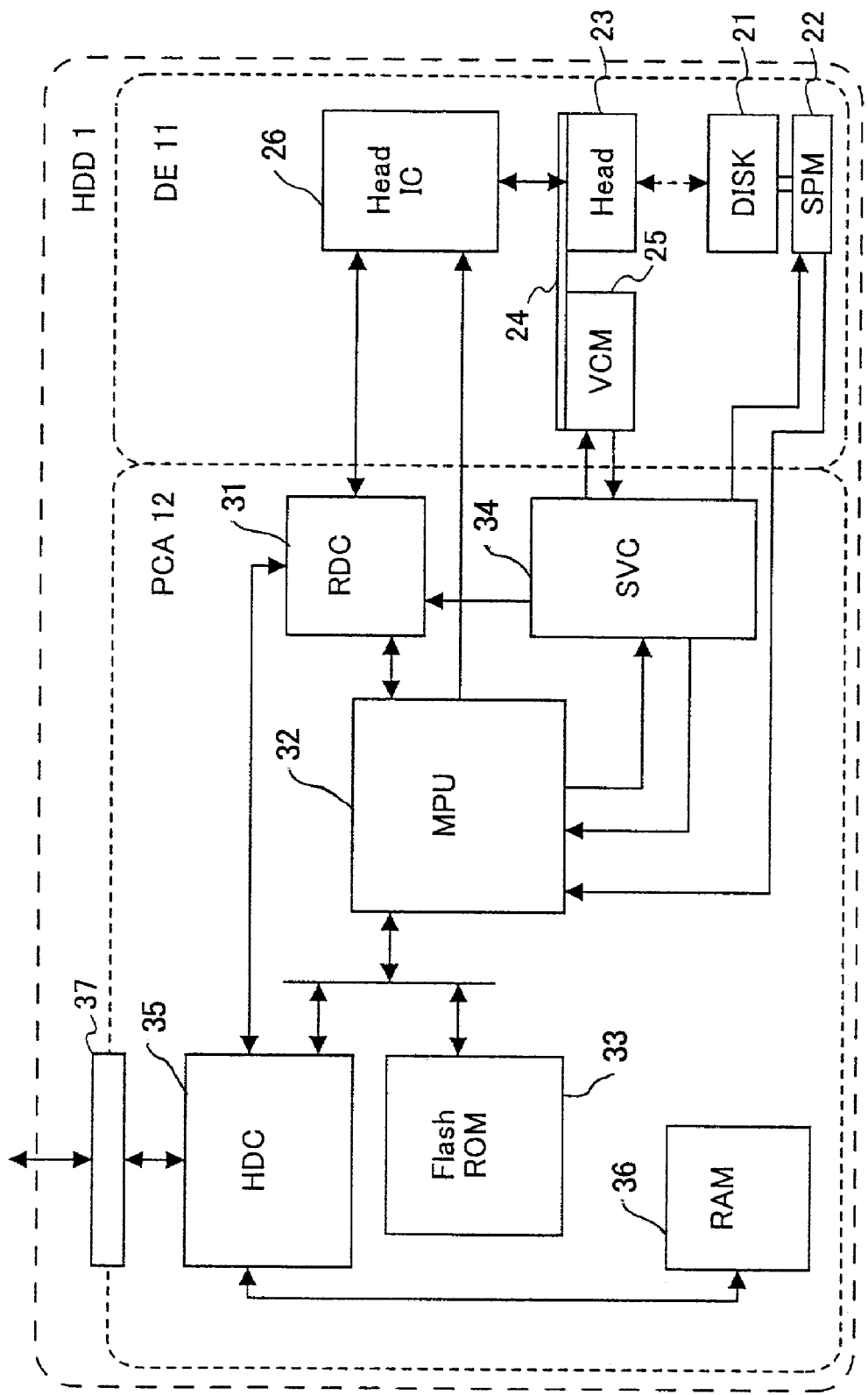
FIG. 3 is a block diagram of the hard disk drive in an embodiment of the present invention.

Referring to FIG. 3, a read channel 31, a micro processing unit (MPU) 32, a read only memory (ROM) 33, a servo controller (SVC) 34, a hard disk controller (HDC) 35, a random access memory (RAM) 36, and an SCSI connector 37 are mounted on the circuit board 12.

The read channel 31 is connected to the head IC 26. The read channel 31 supplies a record signal to the head IC 26 and demodulates a play back signal amplified by the head IC 26 to played back data. The played back data demodulated by the read channel 31 are supplied to the HDC 35. The play back data are stored at the RAM 36 for a time by the HDC 35 and then supplied to the host computer 4 not shown in FIG. 3 through the SCSI connector 37.

A command supplied from the host computer 4 to the SCSI connector 37 is analyzed by the HDC 35. The HDC 35 stores record data at the RAM 36 for a time. When it is necessary to record the record data to the magnetic disk 21, the record data are read from the RAM 36 and supplied to the read channel 31 by the HDC 35. The read channel 31 modulates the record data supplied by the HDC 35 so that the record signal is produced. The record signal modulated by the read channel 31 is supplied to the head IC 26. The record signal supplied by the read channel 31 is amplified and supplied to the magnetic head 23 by the head IC 26. The magnetic head 23 generates a magnetic field corresponding to the record signal supplied from the head IC 26, so that the magnetic disk 21 is magnetized. The magnetic head 23 records the record signal to the magnetic disk 21.

At this time, play back data demodulated by the read channel 31 are supplied to the MPU 32. The MPU 32 produces a control signal for servo-controlling based on the play back data. The servo controller 34 implements servo-controlling based on the control signal from the MPU 32.

The MPU 32 controls whole operations of the hard disk drive 1 based on a command supplied from the host computer 4 through the host adapter 3 and the SCSI bus 2. Furthermore, the MPU 32 collects a command issued by firmware stored in the ROM 33. The MPU 32 analyzes a command issue pattern issued at the hard disk drive 1 by the host computer 4 based on the collected command. In addition, the MPU 32 determines the most proper value of the parameter based on the command issue pattern analyzed by the MPU 32, and thereby a process for setting the most proper value of the parameter as a parameter for controlling an operation of the hard disk drive 1 is executed.

At this time, the collected command and the parameter are stored in a designated area of the magnetic disk 21.

Figure 4:
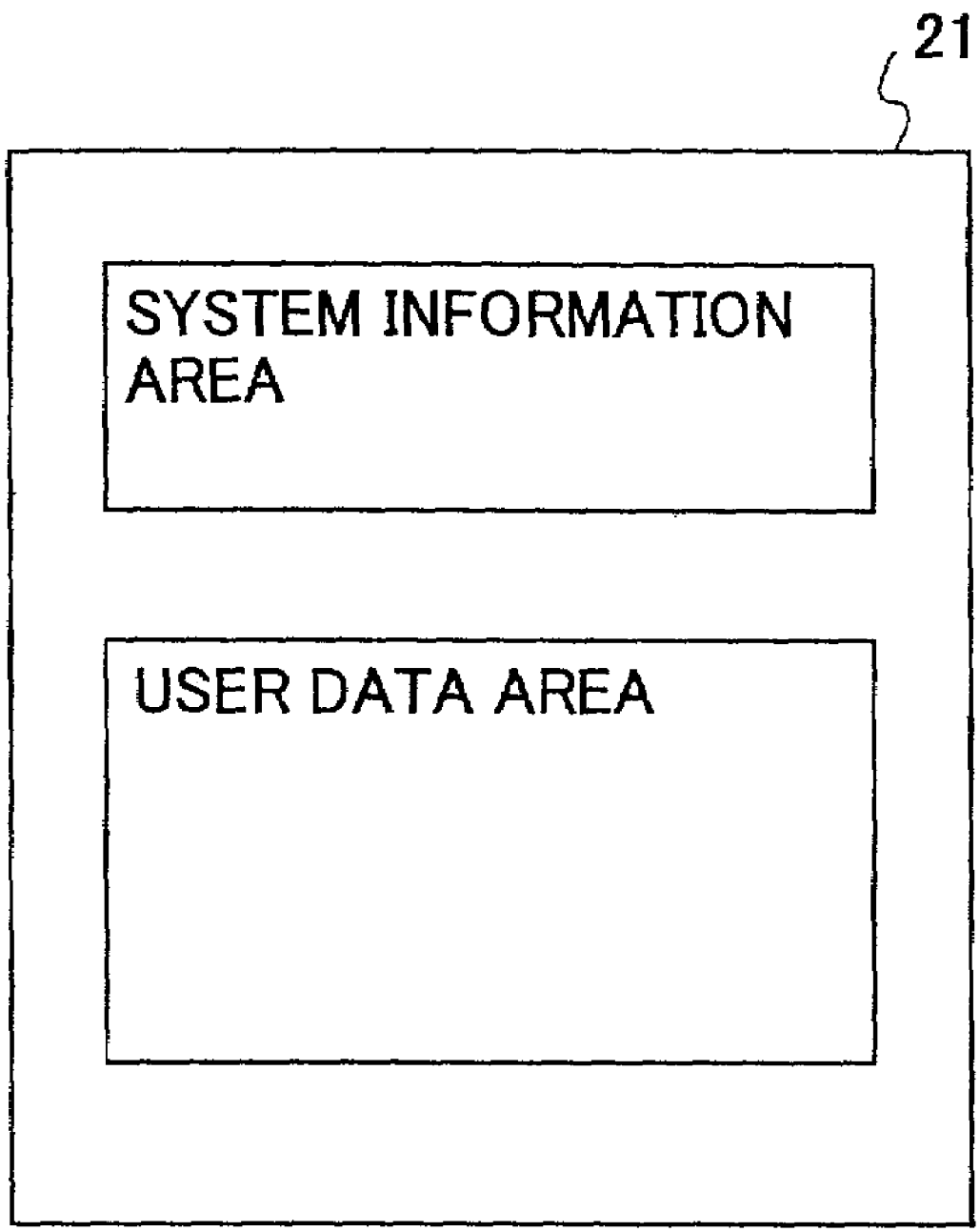
FIG. 4 is an illustration for explaining a storage area of a magnetic disk of the embodiment of the present invention.

FIG. 4 is an illustration for explaining a storage area of the magnetic disk 21.

Referring to FIG. 4, the magnetic disk 21 includes a system information area S and a user data area U. The collected command and the parameter set by the MPU 32 are stored in the system information area S.

Figure 5:
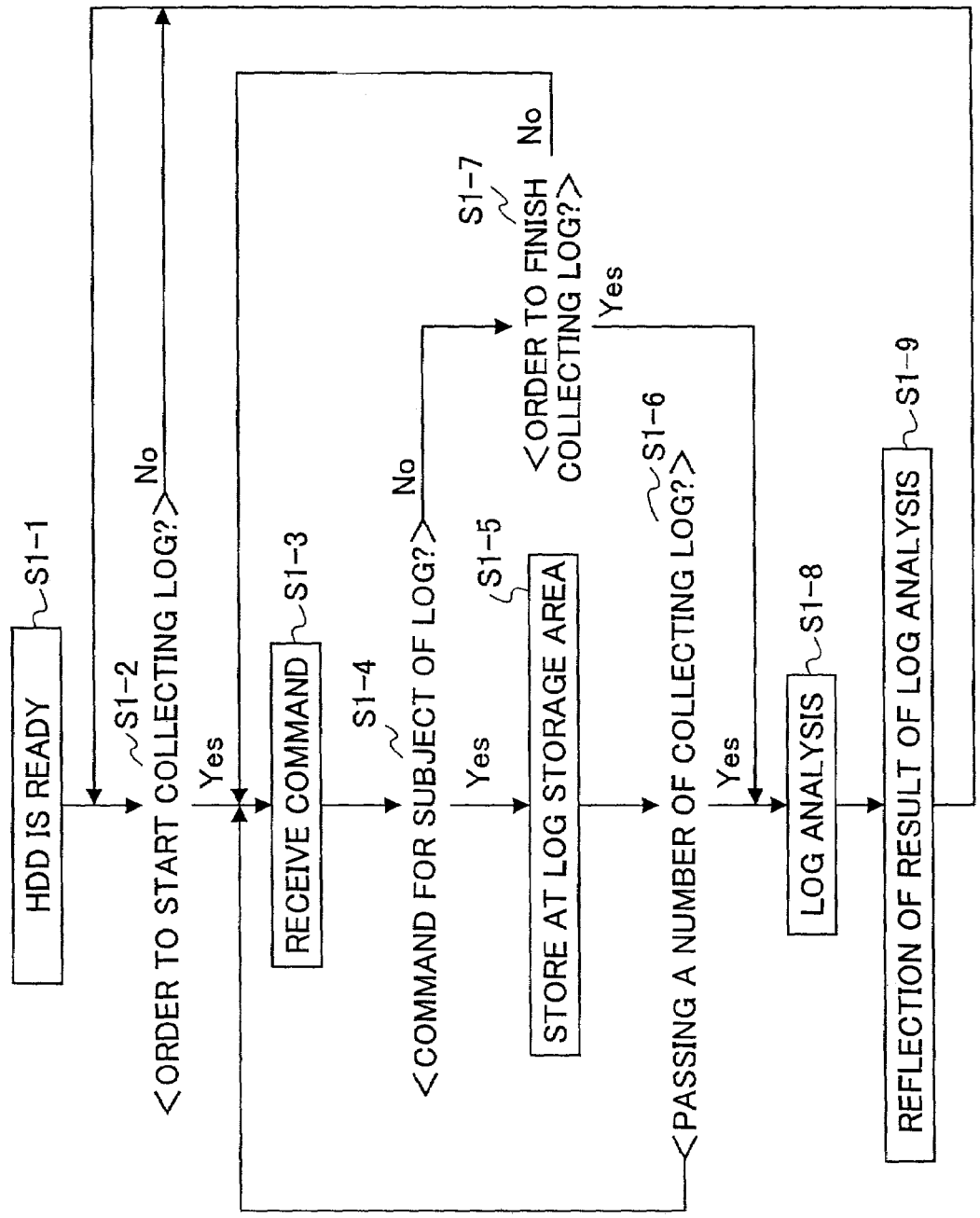
FIG. 5 is a flowchart of a command collect process of the embodiment of the present invention.

FIG. 5 is a flow chart of a command collect process of an embodiment according to the present invention.

In order to collect the command from the host computer 4 by the hard disk drive 1, the hard disk drive 1 is made ready for accessing the magnetic disk 21 in a step S1-1 first. After the hard disk drive 1 is ready, it is determined whether or not collecting log starts implementing in a step S1-2.

A process for collecting the command is executed by adding a vender unique page to a log page of a log select command in commands that are pre-supplied by the host computer 4 in a form of a command collect page shown in FIG. 6.

FIG. 6 is a chart for showing a data structure of the command collect page.

In FIG. 6, a "PAGE CODE" is a peculiar code for identifying the command collect page when a log sense command or a log select command is issued by the host computer.

A "PAGE LENGTH" indicates all byte numbers from a forth byte to an XXth byte. Information of four bytes from a 0th byte to a third byte is called header part.

An "ST" bit is a bit for designating a start or stop of collecting the log. In a case that a log select command where "1" is designated is issued in the "ST" bit, the hard disk drive 1 starts collecting the kind of log information designated at a fifth byte when the command is issued by the host computer 4. In a case that a log select command where "0" is designated is issued at the "ST" bit, the hard disk drive 1 immediately stops collecting an executed log.

Each bit of the fifth byte is a bit for designating a kind of log collecting. When "1" is designated at each of the bits, the hard disk drive 1 collects a designated log.

A "CMD" bit is a bit for ordering to collect command line information issued by the host computer 4.

A "RepType" field designates a method by which a result of an analysis of the log information collected by the hard disk drive 1 is reflected. When "00b" is designated at the field, the disk storage device executes to alter a current value of the mode parameter in order to reflect the result of the analysis immediately. In this case, a save value of the mode parameter is not executed to alter.

When "01b" is designated at the "RepType" field, both the current value and the save value of the mode parameter are executed to alter, so that a result is reflected continuously regardless of a power cycle. When "10b" is designated at the "RepType" field, the hard disk drive 1 does not execute to reflect a result of an analysis immediately. In this case, the hard disk drive 1 reports the result of the analysis as a recommended value of the mode parameter at a log analysis result field locating after the 10th byte in this log page.

The host computer 4 issues a log sense command designating this page, so that the host computer 4 is able to know the recommended value to improve the performance of the hard disk drive.

Referring back to FIG. 5, a determination to execute to collect the log in the step S1-2 is executed based on whether or not the host computer 4 issues the log select command where "1" is designated at the "ST" bit in the log page shown in FIG. 6. Alternatively, the determination is executed based on whether or not a designated value of an "ST" bit saved in the system area S of the magnetic disk 21 is "1".

The hard disk drive 1 receiving an order to start collecting the log receives the command by the host computer 4 in a step S1-3. In a step S1-4, the hard disk drive 1 checks whether or not the received command is a command for a subject of log.

If it is determined in the step S1-4 that the received command is the command for the subject of log, necessary log information is stored at a log storage area by following a designated value at the fifth byte in the page shown in FIG. 6.

After the log information is stored at the log storage area, whether or not a number of collecting the log which is designated at the seventh and eighth bytes shown in FIG. 6 is passed, is checked in a step S1-6. If the number of collecting the log is not passed, a command receiving process following to the step S1-6 is executed. If the number of collecting the log is passed, a log analysis process is executed in a step S1-8 based on the log information that is collected. After the log analysis process is executed, a result of the log analysis process is reflected in a step S1-9 based on the "RepType" filed designated at the 6th byte shown in FIG. 6.

If the command issued by the host computer 4 is not determined as a command for a subject of log in the step S1-4, it is determined in a step S1-7 whether or not the issued command is a log select command designating "0" at the "ST" bit. If the issued command is the log select command designating "0" at the "ST" bit, the analysis process based on the collected log information is executed and a result of the process is reflected by following a designation of the "RepType" field. If the issued command is not the log collect command designating "0" at the "ST" bit, a receiving process of a next command issued by the host computer 4 is executed.

If the log collect process is finished completely, after a reflection of a result of the log analysis, the hard disk drive 1 determines whether or not the order to start collecting the log is ordered. At same time, the hard disk drive 1 implements a normal operation such as an operation of responding to the command issued by the host computer 4. In a case that it is necessary to continue to operate the log collect process, the hard disk drive 1 operates back to the process to determine whether or not the command issued by the host computer 4 is a command for a subject of the log and the process is executed repeatedly.

FIG. 7 is a command storage form in a case that the command collect process is executed. FIG. 8 is an additional command storage form in a case that the command collect process is executed.

A number of receiving a command whose function becomes effective at each corresponding area in a case where "1" is designated at any bit from the 6th bit to the 0th bit of the fifth byte in the log page shown in FIG. 6, is stored in the form shown in FIG. 7.

A form of a command storage area in a case where "1" is designated at the seventh bit in the fifth byte in the log page shown in FIG. 6, is shown in FIG. 8. An opecode, a first logical biock address (LBA) to access a number of a transferred block, a kind of a queue tag, and a time stamp at the time of issuing a command, in a command information issued at the time of receiving the command that is a subject of log, are stored in this area. The number of commands capable of being stored in a log collected with this form is 2000. When all areas are used completely, an oldest log part is overwritten.

Referring back to FIG. 5, in the step S1-9, the hard disk drive 1 reflects a result of the analysis process that is executed based on information collected from the command of the subject of the log with the above-mentioned method and form.

Figure 9:
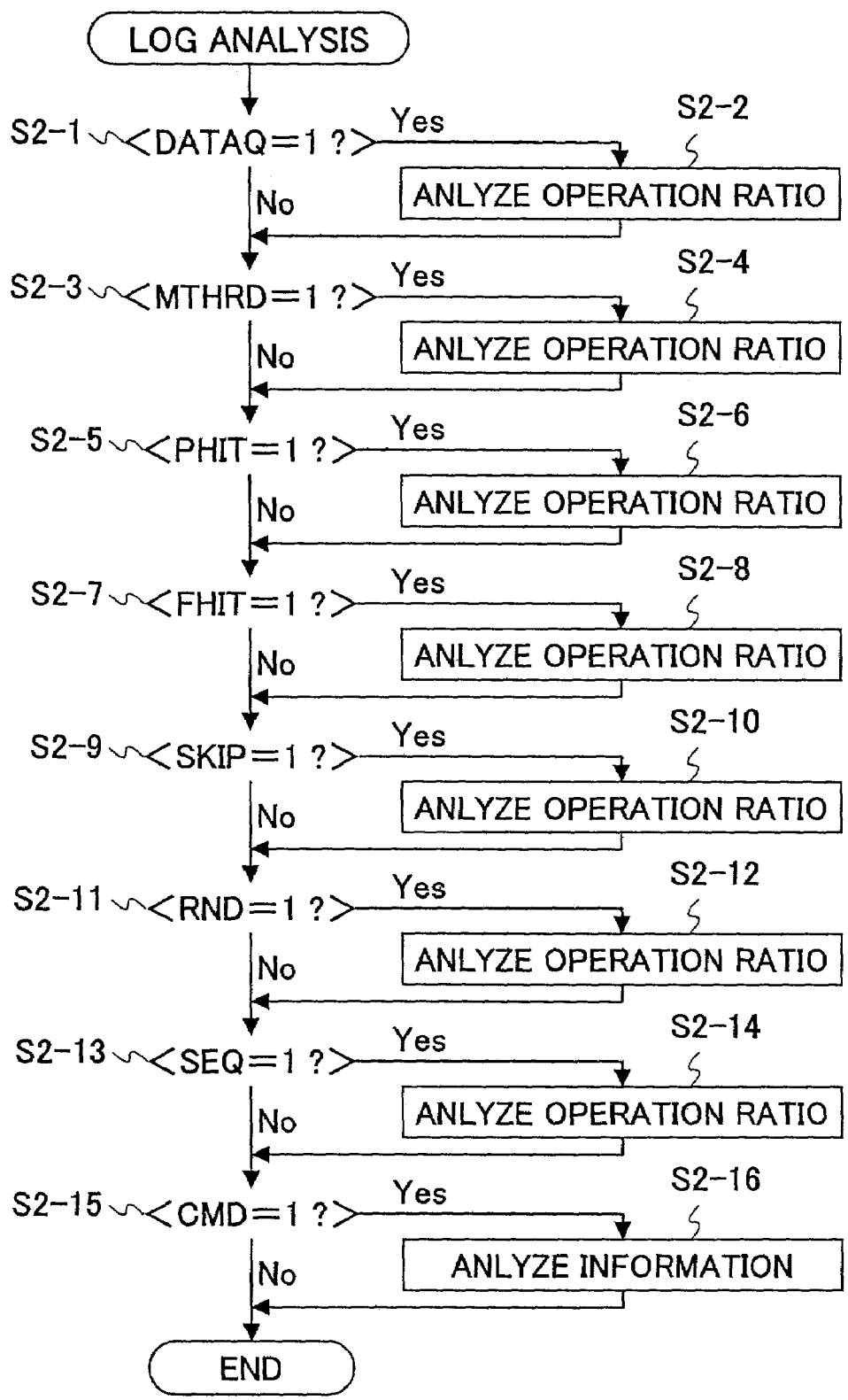
FIG. 9 is a flowchart of a log analysis process.

FIG. 9 is a flow chart of the log analysis process.

Referring to FIG. 9, it is determined in a step S2-1 whether or not the 0th bit of the fifth byte shown in FIG. 6 is "1", that is, whether or not a data queue command DATAQ is a subject of the log. When it is determined in the step S2-1 that the 0th bit of the fifth byte shown in FIG. 6 is "1", that is, the data queue command DATAQ is the subject of the log, a process for analyzing an operation ratio of the data queue command DATAQ is executed in a step S2-2.

Figure 10:
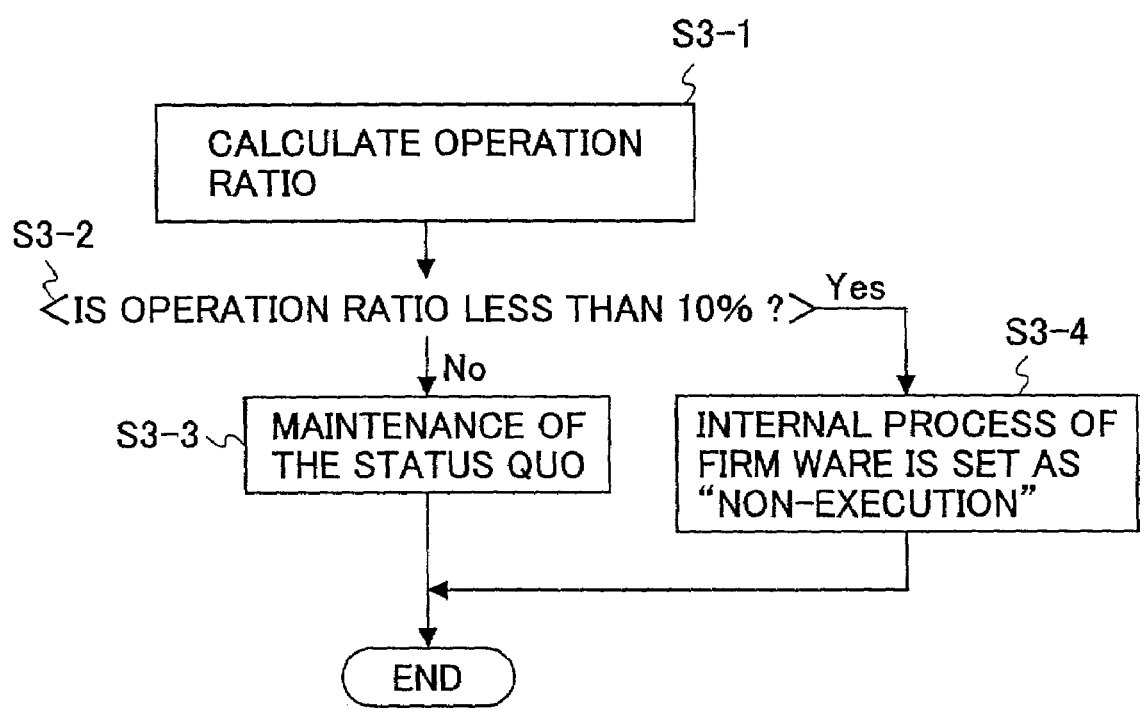
FIG. 10 is a flowchart of a process for analyzing the operation ratio.

FIG. 10 is a flow chart of a process for analyzing the operation ratio.

In the process for analyzing the operation ratio, the operation ratio is calculated in a step S3-1 by applying the number of receiving the command for the subject of log shown in FIG. 7 as a number of a denominator and applying a number of the data queuing operation as a number of a numerator.

Next, it is determined in a step S3-2 whether or not the operation ratio calculated in the step S3-1 is less than 10%. If it is determined in the step S3-2 that the operation ratio is 10% or more, the process for analyzing the operation ratio is terminated with maintenance of the status quo. If it is determined in the step S3-2 that the operation ratio is less than 10%, an internal process of the firm ware is set as a "non-execution" in a step S3-4 and the process for analyzing the operation ratio is terminated.

Referring back to FIG. 9, it is determined in a step S2-3 whether or not the first bit of the fifth byte shown in FIG. 6 is "1", that is, whether or not a multithread command MTHRD is a subject of the log. When it is determined in the step S2-3 that the first bit of the fifth byte shown in FIG. 6 is "1", that is, the multithread command MTHRD is the subject of the log, a process for analyzing an operation ratio of the multithread command MTHRD is executed in a step S2-4 as well as the step S2-2.

Next, it is determined in a step S2-5 whether or not the second bit of the fifth byte shown in FIG. 6 is "1", that is, whether or not a partial hit command PHIT is a subject of the log. When it is determined in the step S2-5 that the second bit of the fifth byte shown in FIG. 6 is "1", that is, the partial hit command PHIT is the subject of the log, a process for analyzing an operation ratio of the partial hit command PHIT is executed in a step S2-6 as well as in the step S2-2.

Next, it is determined in a step S2-7 whether or not the third bit of the fifth byte shown in FIG. 6 is "1", that is, whether or not a full hit command FHIT is a subject of the log. When it is determined in the step S2-7 that the third bit of the fifth byte shown in FIG. 6 is "1", that is, the full hit command FHIT is the subject of the log, a process for analyzing an operation ratio of the full hit command FHIT is executed in a step S2-8 as well as in the step S2-2.

Next, it is determined in a step S2-9 whether or not the forth bit of the fifth byte shown in FIG. 6 is "1", that is, whether or not a skip access command SKIP is a subject of the log. When it is determined in the step S2-9 that the forth bit of the fifth byte shown in FIG. 6 is "1", that is, the skip access command SKIP is the subject of the log, a process for analyzing an operation ratio of the skip access command SKIP is executed in a step S2-10 as well as in the step S2-2.

Next, it is determined in a step S2-11 whether or not the fifth bit of the fifth byte shown in FIG. 6 is "1", that is, whether or not a random access command RND is a subject of the log. When it is determined in the step S2-11 that the fifth bit of the fifth byte shown in FIG. 6 is "1", that is, the random access command RND is the subject of the log, a process for analyzing an operation ratio of the random access command RND is executed in a step S2-12 as well as in the step S2-2.

Next, it is determined in a step S2-13 whether or not the sixth bit of the fifth byte shown in FIG. 6 is "1", that is, whether or not a sequential access command SEQ is a subject of the log. When it is determined in the step S2-13 that the sixth bit of the fifth byte shown in FIG. 6 is "1", that is, the sequential access command SEQ is the subject of the log, a process for analyzing an operation ratio of the sequential access command SEQ is executed in a step S2-14 as well as in the step S2-2.

Next, it is determined in a step S2-15 whether or not the seventh bit of the fifth byte shown in FIG. 6 is "1", that is, whether or not a command for a subject of log CMD is a subject of the log. When it is determined in the step S2-15 that the seventh bit of the fifth byte shown in FIG. 6 is "1", that is, the command for the subject of log CMD is the subject of log, information is extracted from the command for the subject of the log and the information is analyzed in a step S2-16.

In the step S2-16, for example, it is analyzed whether or not the number of transferred blocks has singularity, whether or not access parts of the write command and the read command have singularity, or whether or not the kind of queue tag has singularity.

In the analysis of the log in the collected command, when the command having the number designated at the "number of collection" field at the seventh and eighth bytes in the log page shown in FIG. 6, the analysis is executed based on the collected information and the result of the analysis is reflected even if an order to terminate is not ordered by the log select command. When either "0000h" or "07D0h" is a larger number than a log maximum number collected with a form shown in FIG. 8 is designated, the hard disk drive 1 always analyzes a log collected every receiving two thousand commands for a subject of log for a period of time until the order to finish collecting log is ordered. The result of the analysis is reflected in the step S1-9 shown in FIG. 5.

In the analysis of the log, it is possible to know which function operates and how much the operation ratio of the function is under a circumstance where the hard disk drive 1 is connected based on the information collected with the form shown in FIG. 7. Accordingly, if the operation ratio of the respective functions is less than 10%, a corresponding function of the hard disk drive 1 is not operated, so that it is possible to reduce the overhead by prohibiting implementing a process in the firmware for checking whether the function is applicable. Hence, it is possible to improve the performance of the hard disk drive 1 indirectly. It is possible to determine what kind of an access method by which the host computer 4 applies to the hard disk drive 1, based on information collected with a form shown in FIG. 8.

For example, when a ratio of the simple queue tag of a kind of the queue tags at the time of command issue is less than 10%, the reordering process, by which the command issued by the host computer is stored, is prohibited from implementing. When a lot of commands have transferred blocks less than 100h block, the cache segment size is changed to correspond to the number of the 100h block. Furthermore, when there are a lot of patterns where the same block is written and read, the most proper value of the respective setting value of the mode parameters is changed such as changing the write cache function to the "allowance". As a result of the above-mentioned changing, it is possible to improve the performance in a circumstance of the connecting. That is, the most proper value can be applied as a parameter to control the operation of the peripheral device if needed.

FIGS. 11 through 13 are views for indicating a setting page of a mode parameter. More particularly, FIG. 11 is a view for indicating a disconnect/reconnect parameter setting page, FIG. 12 is a view for indicating a caching parameter setting page, and FIG. 13 is a view for indicating a control mode parameter setting page.

For instance, as described above, when a lot of commands have transferred blocks less than 100h blocks, the size of the setting of the fourteenth and fifteenth bytes of the caching parameter setting page is changed to a size for corresponding to the number of 100h blocks. In addition, when there are a lot of patterns where the same block is written and read, the second bit of the second byte of the caching parameter setting page is changed and the write cache function is allowed.

It is possible to change the set of the buffer full ratio and a buffer empty ratio, by changing the second and third bytes of disconnect and reconnect parameters shown in FIG. 11. In addition, it is possible to set the read cache disable bit by changing the second byte and the 0th bit of the caching parameter setting page as shown in FIG. 12.

In addition, it is possible to change the setting of the number of the cache segment by changing the thirteenth byte of the caching parameter setting page shown in FIG. 12. It is possible to change the minimum pre-fetch parameter by changing the sixth and seventh bytes of the caching parameter setting page shown in FIG. 12. It is possible to change the setting of the number of the maximum pre-fetch parameter by changing the eighth and ninth bytes of the caching parameter setting page shown in FIG. 12. It is possible to change the queue algorithm decorator by changing the third byte and the fourth through seventh bits of the control mode parameter setting page shown in FIG. 13.

According to the embodiment, it is possible to solve a problem in that unnecessary function and improper parameter settings are applied to a system where the disk storage device is mounted. As a result, it is possible to improve efficiency in the system to the maximum.

In addition, according to this embodiment, it is possible to eliminate a step for determining a parameter set for maximum performance.

The present invention is not limited to these embodiments, but variations and modifications may be made without departing from the scope of the present invention. For instance, not only the hard disk drive in this embodiment but also an information storage device such as an optical device or other peripheral devices such as a printer or a scanner can be applied as the peripheral device.

In addition, not only the SCSI interface but also other interfaces such as a universal serial bus (USB) or integrated device electronics (IDE) can be applied as an interface between the host computer and the peripheral device.

This patent application is based on Japanese priority patent application No. 2001-278613 filed on Sep. 13, 2001, the entire contents of which are hereby incorporated by reference.

What is claimed is:

1. A method of setting a parameter of a peripheral device, the parameter controlling an operation of the peripheral device, comprising the steps of:
   a) collecting and storing a plurality of commands issued by a host computer to the peripheral device;

b) analyzing a command issue pattern of the commands issued by the host computer for the peripheral device based on the commands stored in the step a);
c) determining a most proper value of the parameter based on the command issue pattern; and
d) setting the most proper value of the parameter determined in the step c) as a parameter for controlling the operation of the peripheral device,
wherein the parameter is only set to a new value when an operation ratio of a particular type of command exceeds a predetermined value, and
wherein said steps for collecting and storing, analyzing, determining, and setting are performed within the peripheral device.

2. The method of setting a parameter of a peripheral device as claimed in claim 1, wherein the command is collected in a designated period of time in the step a).

3. The method of setting a parameter of a peripheral device as claimed in claim 1, wherein a designated kind of command is collected in the step a).

4. The method of setting a parameter of a peripheral device as claimed in claim 1, wherein the command is started being collected and stored by an order of the host computer in the step a).

5. The method of setting a parameter of a peripheral device as claimed in claim 1, wherein the command is finished being collected and stored by an order of the host computer in the step a).

6. The method of setting a parameter of a peripheral device as claimed in claim 1, wherein the most proper value of the parameter is set by an order of the peripheral device in the step d).

7. A peripheral device in which a parameter for controlling an operation of the peripheral device is set, comprising:
means for collecting and storing a plurality of commands issued by a host computer for the peripheral device;
means for analyzing a command issue pattern of the commands issued by the host computer for the peripheral device based on the commands stored by the means for collecting and storing;
means for determining a most proper value of the parameter based on the command issue pattern;
wherein the parameter is only set to a new value when an operation ratio of a particular type of command exceeds a predetermined value, and means for setting the most proper value of the parameter determined by the means for determining the most proper value as a parameter for controlling the operation of the peripheral device.

8. The peripheral device as claimed in claim 7, wherein the means for collecting and storing collects the commands in a designated period of time.

9. The peripheral device as claimed in claim 7, wherein the means for collecting and storing collects a designated kind of commands.

10. The peripheral device as claimed in claim 7, wherein the means for collecting and storing starts collecting and storing based on an order of the host computer.

11. The peripheral device as claimed in claim 7, wherein the means for collecting and storing finishes collecting and storing based on an order of the host computer.

12. The peripheral device as claimed in claim 7, further comprising means for notifying the host computer of the most proper value determined by the means for determining the most proper value, and wherein means for setting the most proper value of the parameter sets the most proper value of the parameter determined by the means for determining the most proper value as the parameter for controlling the operation of the peripheral device based on an order by the host computer.

13. The method of setting a parameter of a peripheral device as claimed in claim 1, wherein said step of collecting and storing the plurality of commands is performed when the host computer issues a predefined command to collect and store the plurality of commands.

14. The method of claim 1, wherein the plurality of commands collected and stored are commands selected from the group consisting of data queuing, multithread, skip access, partial hit of cache, and full hit of cache.

15. The method of claim 7, wherein the plurality of commands collected and stored are commands selected from the group consisting of data queuing, multithread, skip access, partial hit of cache, and full hit of cache.

* * * * *